United States Patent [19]
Taylor et al.

[11] Patent Number: 5,490,030
[45] Date of Patent: Feb. 6, 1996

[54] ELECTROMAGNETIC AND RADIO FREQUENCY INTERFERENCE SUPPRESSION FOR GROUND FAULT CIRCUIT INTERRUPTERS

[76] Inventors: Harold L. Taylor, 1505 Treetrail Pkwy., Norcross, Ga. 30093; Elton C. Johnson, 2515 Mprtjeast Expressway, Apt. L-14, Atlanta, Ga. 30345

[21] Appl. No.: 189,217

[22] Filed: Jan. 31, 1994

[51] Int. Cl.$^6$ ............................................. H02H 3/16
[52] U.S. Cl. ............................ 361/45; 361/46; 361/50
[58] Field of Search .................................. 361/46, 49, 50

[56] References Cited

U.S. PATENT DOCUMENTS

| | | | |
|---|---|---|---|
| 4,216,515 | 8/1980 | Van Zeeland | 361/45 |
| 4,342,974 | 8/1982 | Nakano et al. | 335/10 |
| 4,568,899 | 2/1986 | May et al. | 335/18 |
| 4,609,898 | 9/1986 | Seymour et al. | 335/202 |
| 4,641,217 | 2/1987 | Morris et al. | 361/45 |
| 4,933,801 | 6/1990 | Glennan et al. | 361/45 |
| 5,258,732 | 11/1993 | Marquardt | 335/17 |
| 5,260,676 | 11/1993 | Patel et al. | 335/18 |

*Primary Examiner*—Todd E. DeBoer

[57] ABSTRACT

A ground fault interruption circuit has a detector circuit coupled to an electrical distribution circuit load to detect ground fault conditions in the load. A filtering circuit connected between the detector circuit and distribution network comprises a pi-network filter for attenuating common-mode electromagnetic interference and differential-mode electromagnetic interference. The pi-network filter includes three filter portions which together provide a third order filter to attenuate the interference signals at the frequencies of interest.

19 Claims, 4 Drawing Sheets

ELECTROMAGNETIC AND RADIO FREQUENCY INTERFERENCE SUPPRESSION FOR GROUND FAULT CIRCUIT INTERRUPTERS

FIELD OF THE INVENTION

The present invention is directed to ground fault circuit interruption (GFCI) circuits used to detect ground or neutral faults in electric distribution systems.

DESCRIPTION OF THE PRIOR ART

GFCI circuits typically use a high turn ratio ground fault sense transformer connected to detect the current in the neutral wire in an electrical distribution system. The secondary of the transformer is connected to the input and to a high gain amplifier and the output is connected to a comparison circuit of a triggering device such as an SCR. The amplifier provides an amplified signal proportional to the neutral line current. When the amplified signal exceeds a certain reference level as determined by a comparison circuit, indicating a ground fault condition, the triggering device effects operation of a relay solenoid whose contacts become open to disconnect the load from the line.

GFCI circuits may be subject to noise, radio signals and other phenomena (either radiated in free space or conducted within the electrical distribution system), which may affect operation of the circuit. Such interference may comprise electromagnetic interference (EMI), including radio frequency interference (RFI) signals lying within the radio frequency band.

One of the primary mechanisms by which EMI/RFI signals can perturb the operation of a GFCI circuit is the coupling of spurious energy into the inputs of a high gain amplifier which is typically used in a circuit to detect the neutral or ground faults. This coupling begins with the current carrying conductors (line conductors) in the electrical distribution system itself. These conductors can either carry conducted noise from a source connected to some other branch of the system, or they can act as antennas, or receptors, to convert radiated signals (such as radio waves) into conducted signals within the electrical distribution system. These spurious signals may then be coupled from the line conductors to a secondary winding of the ground fault sensor transformer by way of the parasitic capacitances existing between the primary and secondary terminals of the transformer.

Once the spurious signal has made its way into the transformer secondary, it is conducted through the circuitry that couples the transformer to the inputs of the sensing amplifier. While the signal may change form as it passes through the various circuit elements between the line conductors and the amplifier inputs, some component of the signal typically influences the operation of the amplifier in such a way to either increase or decrease the functional ground-fault sensitivity which may create nuisance or false tripping on moderately leaky loads, or may cause nuisance tripping under no-load, no fault conditions in extreme cases. An increased ground-fault and grounded neutral sensitivity may increase the ground-fault threshold trip to above 6 milliamps, which is the upper limit for ground fault threshold mandated by Underwriters Laboratories, and/or the unit will not trip in the presence of a 2-ohm grounded neutral loop, the highest loop impedance for tripping mandated by Underwriters Laboratories. In extreme cases, it is theoretically possible that the GFCI is rendered inoperable, becoming functionally equivalent to a thermal-magnetic circuit breaker.

Prior art GFCI circuits typically employ a full wave bridge rectifier having four diodes. This system is not effective for decoupling RF energy away from the circuit because a diode is in the circuit path at all times between the circuit common and the line connections in the load center. Diodes are particularly poor conductors of RF energy, as they tend to modulate and rectify RF signals. This causes the circuit common to float with respect to its proper potential, which disturbs the GFCI's operation. Furthermore, this energy is only routed directly to earth ground (through a diode) during 50 percent of each 60 Hz line cycle—when the line hot conductor is at a higher potential than the neutral. During the other 50 percent of each cycle—when the line hot conductor is at a lower potential than line neutral— any RF energy that is coupled to circuit common must take an indirect route from the line hot conductor, through a transformer winding in the service equipment, to earth ground. This extended path can act as an additional coupling mechanism for radiated EMI/RFI, causing more problems in the GFCI.

It would be advantageous to overcome the disadvantages of the prior art devices by improving the immunity of the GFCI circuit to noise interference, such as EMI and RFI interference.

SUMMARY OF THE INVENTION

It is an object of the present invention to provide a GFCI circuit having increased immunity to interference, such as EMI and RFI signals.

It is an object of the present invention to provide a filtering circuit between the output of the transformer secondary leads and the amplifier inputs that will reduce or remove any spurious high-frequency energy from the incoming signal.

It is an object of the present invention to provide a grounding arrangement that will render the GFCI circuit more immune from interference noise.

The present invention provides a GFCI circuit having a filter circuit for attenuating common-mode and differential mode EMI/RFI signals. In the preferred embodiment, a first circuit filtering portion which may be a capacitor attenuates differential-mode EMI/RFI by shorting out high frequency components of the incoming signal that are coupled into the transformer secondary. A second circuit filtering portion which may be one or more inductors attenuates common-mode and differential-mode EMI/RFI by blocking high-frequency components from passing through them. A third circuit filtering portion which may be one or more capacitors attenuates common-mode EMI/RFI components by shorting high-frequency components to circuit common, which is tied to earth ground. When using two capacitors, they combine in series to act as one differential-mode capacitor having half the value of either individual capacitor. A fourth circuit filtering portion, which may be an RC low pass filtering section, attenuates any differential-mode EMI/RFI that has passed through the preceding filtering portion.

According to one aspect of the present invention, a ground fault interruption circuit is provided, for disconnecting a load from an electrical distribution line in response to ground fault conditions in the load, comprising coupling means coupled to an electrical distribution network load for providing ground fault imbalance signals, detector circuit means connected to receive said ground fault imbalance signals and for providing a trigger signal when a ground fault condition exists, control circuit means for disconnecting the load from the line in response to said trigger signal, and a filtering circuit connected to said coupling means and said detector circuit for attenuating electromagnetic interference signal components from said ground fault signals.

The filtering circuit preferably comprises a first filter element for attenuating differential-mode electromagnetic interference signals, a second filter element for blocking common-mode electromagnetic interference signals, a third filter element for attenuating common-mode electromagnetic interference signals, and a fourth filter element for attenuating differential-mode electromagnetic interference signals.

The coupling means preferably comprises a sense transformer having a primary coupled to the electrical distribution line and a secondary winding, wherein the first filter element comprises a capacitor connected across the secondary winding.

The filtering circuit preferably comprises a band stop third order filter arranged as a pi-network filter.

The second filter element may comprise at least one inductor and preferably two. The third filter element may comprise at least one capacitor, and the fourth filter element may comprise a resistor and capacitor.

The control circuit means preferably comprises an SCR and a solenoid connected in series, wherein the SCR provides a low impedance path to ground in response to the trigger signal, and wherein the ground fault interruption circuit comprises a capacitor connected to a control terminal of the SCR to filter noise signals from the SCR control terminal, the capacitor providing a characteristic time constant, to thereby filter noise having a shorter period than said time constant.

According to another aspect of the invention, the ground fault interruption circuit further comprises first and second ground planes and a power supply circuit for generating power for the detector circuit, wherein the supply circuit is grounded to the first ground plane, and the coupling circuit and filtering circuit are grounded to the second ground plane, to separate noise signals in the respective circuits in the ground planes.

According to another aspect of the invention, a ground fault interruption circuit is provided, for disconnecting a load from an electrical distribution line in response to ground fault conditions in the load, comprising coupling means coupled to an electrical distribution network load for providing ground fault imbalance signals, the coupling means comprising a sense transformer having a primary coupled to the electrical distribution line and a secondary winding, detector circuit means connected to receive the ground fault imbalance signals and for providing a trigger signal when a ground fault condition exists, control circuit means for disconnecting the load from the line in response to the trigger signal, and a filtering circuit connected to the coupling means and the detector circuit for attenuating electromagnetic interference signal components from the ground fault imbalance signals, the filtering circuit comprising pi-network filter having a first, shunt element comprising a capacitor connected across the secondary winding, a second, series element comprising inductors in series with the respective secondary windings, and a third, shunt element comprising two capacitors connected with each capacitor in shunt across a different secondary winding after said second elements, the filtering circuit attenuating differential-mode and common-mode electromagnetic interference signals from the ground fault imbalance signals.

Other objects, advantages and features of the invention will be more readily understood when considering the following detailed description, claims and drawings.

DETAILED DESCRIPTION OF THE PREFERRED EMBODIMENT

Figure 1:
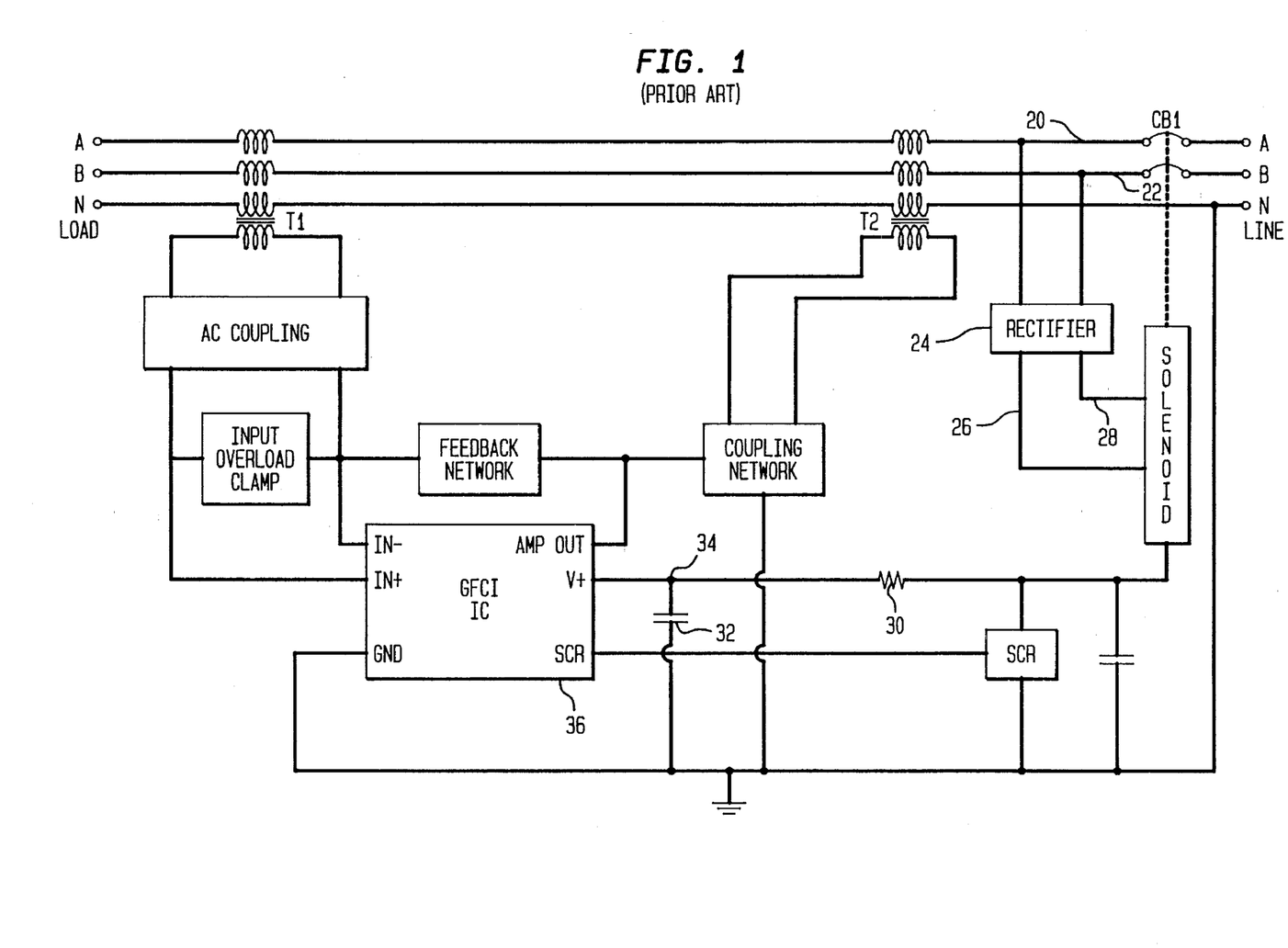
FIG. 1 is a block diagram of a conventional GFCI circuit according to the prior art.
Figure 2:
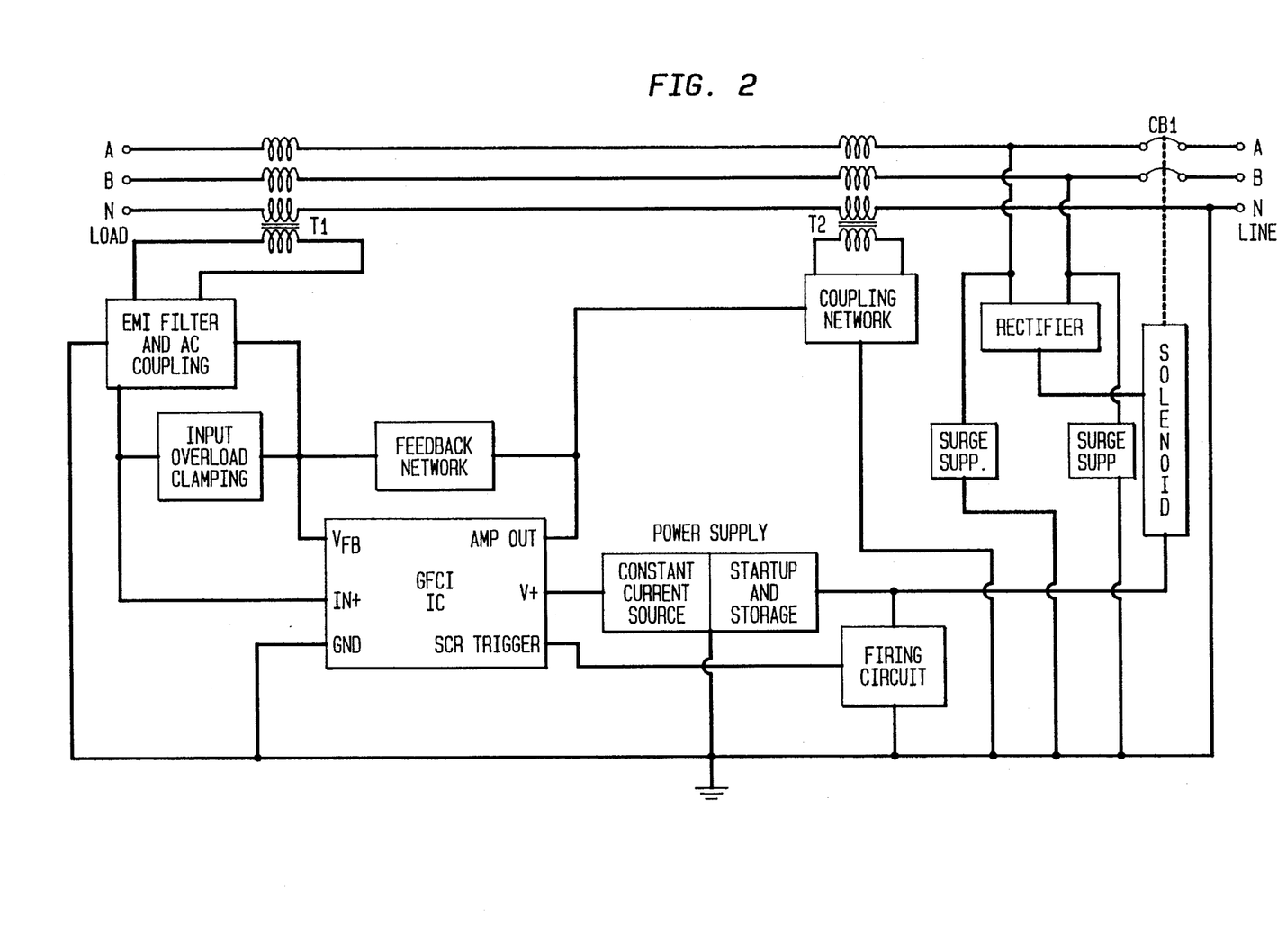
FIG. 2 is a block diagram of a GFCI circuit according to the present invention.
Figure 3:
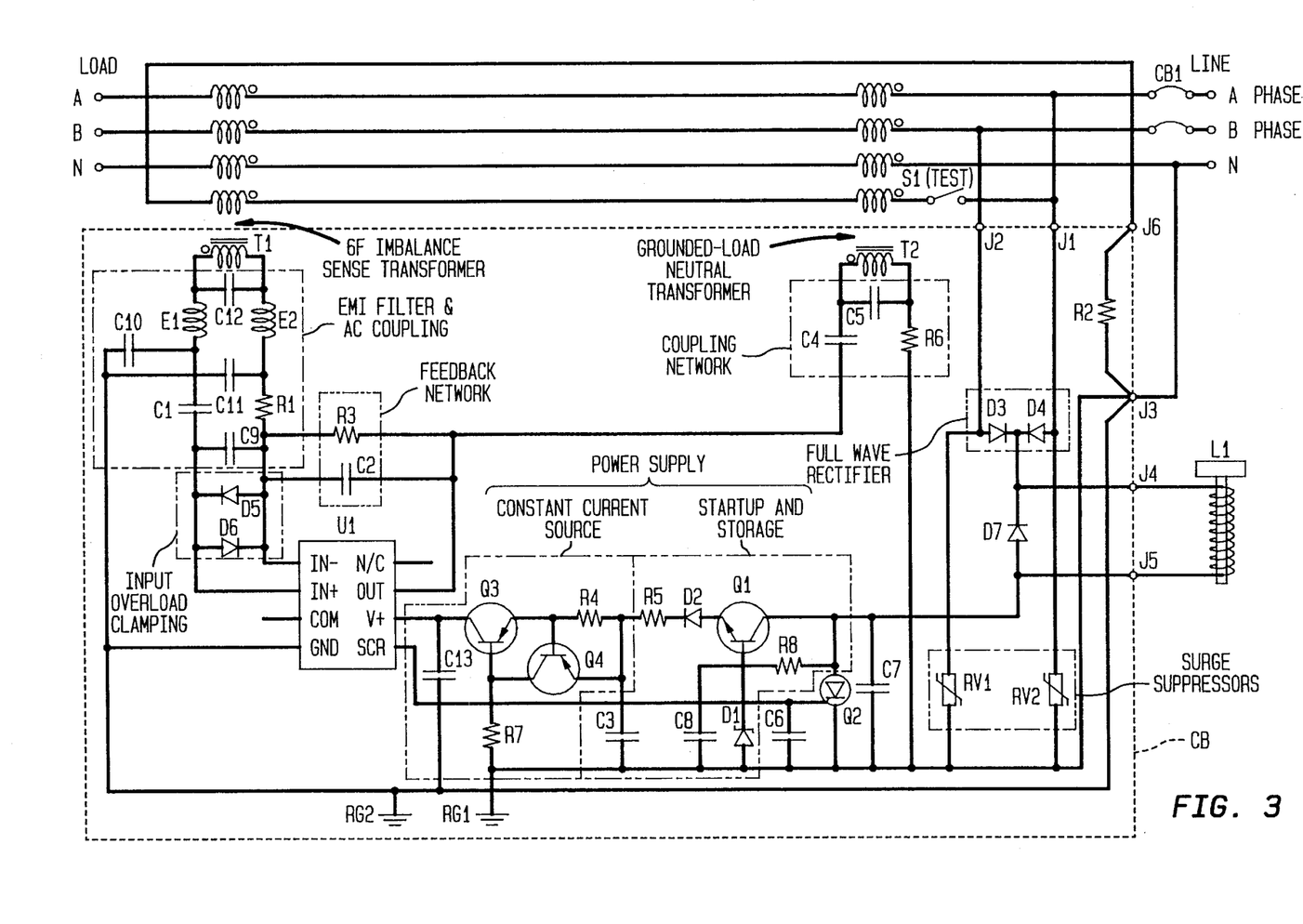
FIG. 3 is a schematic of a GFCI circuit according to the present invention.

Referring to FIG. 2, which shows a block diagram of a GFCI according to the invention, and FIG. 3 which shows a schematic of a GFCI according to the invention, an electrical distribution system represented on the top of the figure comprises a three wire two phase AC network, having lines A and B, each being 110 VAC relative to neutral N, and being 180° out of phase with each other, to also provide 220 VAC between lines A and B. The LINE connections are on the right and the LOAD connections to a Load L are on the left. The connection between LINE and LOAD for each line A and B can be interrupted by relay contacts CB1, which are normally closed, but which can be opened by energizing a 120 V solenoid connected to connections J4 and J5 in the schematic with sufficient current.

A GFCI circuit is shown with substantially all its components mounted on a circuit board CB represented by a large dashed rectangle with connections J1–J6 along its edge. The GFCI circuit is connected to the electrical distribution system lines A and B at connections J1 and J2, respectively. A sense transformer T1, having a primary/secondary turns ratio of about 1:600, is connected to lines A, B, N and a test line to detect a ground fault imbalance. Another transformer T2, having a turns ratio of about 1:200 is similarly connected to the same lines to detect grounded-load neutral conditions.

The transformer T1 secondary leads are connected to a ground fault circuit interrupter integrated circuit chip U1, which may be a Raytheon model RV4145M chip, through an EMI filter and AC coupling circuit, and an input overload clamping circuit. The U1 chip has an internal operational amplifier (op amp), a comparison circuit and an output to fire an SCR. The transformer T2 secondary leads are also connected to the U1 chip through a coupling network of capacitors C4, C5 and resistor R6. Grounded neutral fault detection is accomplished when a short or fault closes a magnetic path between the sense transformer T1 and the grounded neutral transformer T2. The resultant AC coupling closes a positive feedback path (through a feedback circuit) around the op amp in the U1 chip, and the op amp then oscillates. When the peaks of the oscillation voltage exceed the SCR trigger comparator thresholds, the SCR output will go high to fire the SCR. When the SCR fires, a low impedance circuit is created across its anode and cathode terminals, resulting in an increase in current through the solenoid sufficient to drive its plunger to open the contacts CB1 in the lines A and B and disconnect the LOAD from the LINE.

The sensitivity to grounded neutral faults is adjusted by changing the frequency of oscillation. Increasing the frequency reduces the sensitivity by reducing the loop gain of the positive feedback circuit. As frequency increases, the signal becomes attenuated and the loop gain decreases. With typical values, the circuit will detect a grounded neutral having resistance of 2 ohms or less.

The U1 chip is supplied with a +24 volt supply at its $V_+$ input by a power supply circuit comprising a startup and storage portion and a constant current source portion. The power supply circuit is connected to the hot lines A and B at connections J1 and J2 respectively. A full wave rectifier comprising diodes D3 and D4 provides a rectified signal at connection point J4 of the solenoid L1. Each of diodes D3 and D4 contributes alternating pulses from the two respective phases. Specifically, diode D3 contributes positive pulses from phase B, discarding negative pulses, and diode D4 contributes positive pulses from phase A, discarding negative pulses. (See FIG. 4, top right). In the case where only one pulse is energized, alternating pulses will be missing (See FIG. 4, top left).

In its normal state, in the absence of ground or neutral faults, the solenoid is normally closed and the peak voltage at its upper terminal (relative to circuit ground) is about 170 volts, or 120 volts rms, and its impedance is about 30 ohms. The impedance of the solenoid is in series with the impedance of the remainder of the circuit. When the SCR is not conducting, the total circuit impedance seen by the 120 volt rms signal results in a current through the solenoid of about 5 milliamps, which is insufficient to trigger the solenoid. When the SCR fires, the impedance between the bottom of the solenoid (J5) and ground is relatively small because an essentially short circuit is created from node 1 through the SCR to ground. Except for a voltage drop of about 1 volt across the SCR, the entire 120 volts appears across the solenoid 30 ohm impedance, resulting in a current on the order of 3 or 4 amps which triggers the solenoid plunger and opens the contacts CBI to disconnect the LOAD from the LINE.

A diode D7 clamps the voltage when the solenoid triggers to prevent damage to the power supply and other circuitry. Surge suppressors RV1 and RV2 are also provided, which protect the circuit from voltage surges, clamping the voltage to ground under surge conditions.

Figure 4:
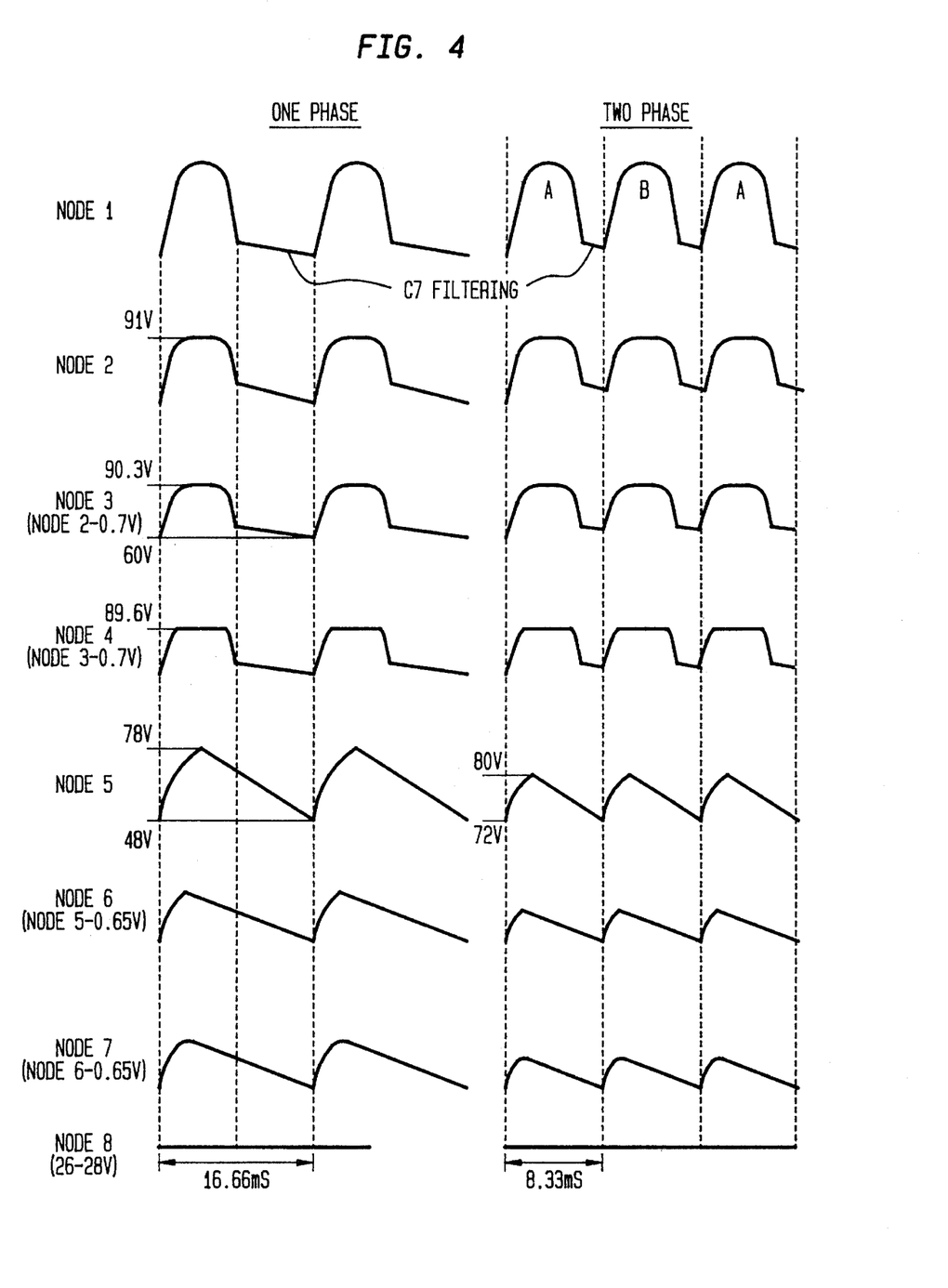
FIG. 4 is a drawing of waveforms at selected circuit nodes of the circuit of FIG. 3, for an aid in understanding the operation of the circuit.

Capacitor C7 filters noise off the line in cooperation with the solenoid winding as a two element LC filter. Capacitor C7 thus prevents accidental transient dV/dt triggering of the SCR. Capacitor C7 also functions to store energy and filters high frequency noise to keep the rest of the circuit working in close conjunction with the solenoid. Capacitor C7 stores charge between the peaks of the rectified pulses, smoothing out the rectified signal even when only one of the two line phases A or B is operative. As shown in FIG. 4, if only one of the two lines A and B are energized, the rectified signal appears to be a half rectified wave. If both lines A and B are energized, the rectified signal will appear to be a full rectified wave.

Capacitor C6 serves to protect the SCR trigger gate by (1) immunizing the gate from noise to minimize or eliminate any false triggering from narrow pulses, (2) protecting against fast transient current changes, and (3) providing a slight time delay to the gating of the SCR after a firing signal appears at the SCR output of the U1 chip, because the firing signal will first charge the capacitor C6, whose impedance is less then the impedance of the SCR gate when the SCR is off.

Capacitors C6 and C7 are dV/dt capacitors to prevent false triggering of the SCR due to fast voltage transients between the anode and gate of the SCR which have been known to cause false triggering at the SCR in prior art GFCI designs.

The Zener diode D1 provides a reference of 91 volts, the maximum Zener current is the maximum applied voltage (170 volts peak) at node 1 minus its breakdown voltage of 91 volts divided by the value of resistor R8 (56 k ohms), which is about 1.4 milliamps peak or about 1 milliamp rms. If the voltage at the Zener diode is less than or equal to 91 volts, the base-emitter voltage of transistor Q1 is about 0.7 volts, so the emitter voltage at node 3 is about 91–0.7 volts or about 90 volts. The maximum rating of $V_{CE}$ of Q1 is about 300 V, so the collector can go as high as about 390 V before breakdown. Over voltage conditions of lines A or B do not normally exceed 187 volts. Under normal quiescent operating conditions about 2–5 milliamps current is delivered to the collector of transistor Q1. Capacitor C8 is a filter capacitor to remove switching noise primarily attributable to Zener diode D1 from the base of transistor Q1.

Diode D2 prevents reverse leakage current through Q1 when the electrical system is operating only one of the A and B phases, (whereby current could leak between the rectified pulses), or when the SCR fires. If leakage occurred, capacitor C3 could become discharged, which is undesirable. Capacitor C3 is a reservoir of electrical charge for the current source portion of the power supply circuit. Capacitor C3 functions with resistor R5 to filter high frequency noise for transistor filtering. The voltage drop from node 4 to node 5 is about 10 volts due to the current value of about 5 millamps through resistor R5 having a value of about 2 k ohms.

The start-up and storage portion of the circuit serves to provide a low input impedance charging path through resistor R5 to charge capacitor C3 up to about 80 volts within 2 milliseconds. The circuit provides voltage regulation to capacitor C3 through the Zener diode D1. The Zener diode D1 clamps the voltage of the gate of transistor Q1 to the Zener diode breakdown voltage of 91 volts. Resistor R8 regulates current flow through Zener diode D1 and provides current to the base of transistor Q1. The maximum input voltage to resistor R8 is about 170 volts and its maximum output voltage is about 91 volts due to the clamping effect of the Zener diode D1.

The power supply includes a floating constant current portion comprising transistors Q3 and Q4 and resistors R4 and R7. Capacitor C13 connected to the output of this circuit is a filter capacitor, which functions to remove any remaining noise from the current source portion of the circuit to prevent inadvertent pulsation of the detector chip U1.

The constant current source is pseudo-voltage independent and maintains a constant current output of about 3.2 milliamps at the collector terminal of transistor Q3 regardless of the voltage between voltage divider R4 and R5. The current source acts like a shock absorber to absorb the excess voltage across the capacitor C3. Resistor R4 having a value of 200 ohms, in conjunction with transistor Q4, serves as a current regulator to set the amount of current into the emitter terminal of transistor Q3. Almost all of the current through resistor R4 also goes through the Q3 emitter/collector path due to the relatively high impedance of the base of transistor Q4. The voltage drop $V_{BE}$ of transistor Q4 is about 0.65 V, which is the reference voltage for this portion of the circuit.

This clamps the voltage across resistor R4 to about 0.65 V, which in turn regulates the current to 0.65 V/200 ohms or about 3.2 milliamps through R4, through the emitter-collector path of transistor Q3 and to the V+terminal of the U1 chip. This current is regulated at 3.2 milliamps regardless of the voltage at the voltage divider point node 5 between resistors R4 and R5. Being substantially voltage independent (or pseudo-voltage independent) the constant current source with its storage capacitor C3 can ride through AC zero crossings and also work at low line voltages of about 55–60 volts.

Resistor R7 keeps the current flow out of the Q4 collector low enough so as not to burn out transistor Q4, also keeping the current flow through the base of transistor Q4 sufficiently low, so as not to add much current to resistor R4 current output. Resistor R7 therefore functions to bias transistors Q3 and Q4 to active regions of operation. Capacitor C13 is connected to node 8, which is at the collector of transistor Q3 and the input V+of the detector U1 chip. Capacitor C13 functions to filter the output of the constant current power supply portion, which is a substantially constant 3.2 milliamp current supply at about 26 to 28 volts dc relative to ground.

The EMI filter and AC coupling circuit is connected between the sense transformer T1 and detector chip U1 and comprises a number of filter elements which together attenuate both common mode and differential-mode signals. The first element of the filter circuit comprises capacitor C12. This capacitor attenuates differential-mode EMI/RFI by shorting out high-frequency components of the incurring signal that are coupled into the transformer T1 secondary.

The second element of the filter circuit comprises inductors E1 and E2, which attenuate common-mode and differential-mode EMI/RFI by blocking high-frequency components from passing through them. Inductors E1 and E2 may be Fair-rite 2761015112 ferrite beads.

The third element of the filter comprises capacitors C10 and C11, which attenuate common-mode EMI/RFI components by shorting high-frequency components to circuit common, which is tied to earth ground. They also combine in series to act as one differential-mode capacitor having half the value of either individual capacitor. These three filter elements comprising components C12, E1, E2, C10 and C11 comprise a third-order low pass filter having an attenuation slope or roll-off of $-18$ dB/octave, which is $-6$dB/octave for each of the three lumped filter elements.

Capacitor C9 functions as an auxiliary filter by coupling with resistor R1 to form an additional low-pass filter section or element. This section attenuates any differential-mode EMI/RFI that has passed through the preceding filter elements or sections. The capacitor C9 prevents this energy from being coupled into either D5 or D6, or into the transistor junctions in the first stage amplifier circuit of the detector chip U1.

Diodes D5 and D6 comprise an input overload clamping circuit, to clamp the signals inputted to the detector chip U1.

The filter design according to the present invention takes into account the non-ideal behavior of the filter elements, and their ultimate effect on the behavior of the filter to attenuate the EMI/RFI frequencies of interest in the stop band. For example, inductors have an impedance which rises with increased frequency, for lower frequency ranges. Above this range, parasitic capacitance of the physical inductor construction tends to alter the ideal impedance/ frequency curve, making it actually fall with frequency above the frequency corresponding to the maximum impedance. The objective is to provide the maximum impedance of the device at the frequency band of interest, to filter or attenuate this undesired noise. The same principles apply to capacitors, which although their basic impedance falls with increasing frequency, their parasitic inductance influences the impedance curve to create a minimum magnitude of impedance at a certain resonant frequency characteristic of the device.

The net result of these non-ideal characteristics of inductors and capacitors is to end up with a band reject filter at the EMI/RFI frequencies of interest, instead of an ideal low-pass filter. Low frequencies and high frequencies pass through the filter unattenuated, whereas the frequency range of the EMI/RFI signals which cause the greatest perturbation in the GFCI's operation is rejected by the filter. It is preferred to also consider the parasitic inductances and capacitances that exist as functions of the printed circuit board (PCB) geometry and fabrication, and their respective influences on the behavior of the inductor and capacitor lumped elements.

The topology of the filter is a "pi" network which is functionally compatible with the current source output of sense transformer C1. The pi-network topology comprises a shunt element first, followed by a series element, followed by another shunt element. The filter according to the invention provides a multi-element network specifically tuned to prevent RFI energy from entering the input of the detector chip U1. The topology removes both common-mode and differential-mode spurious components from the signal received from the sense transformer T1 secondary. The pi topology gives maximum attenuation of RFI energy that is injected from the current-source output of the sense transformer T1. The filter's circuit common is directly tied to earth ground.

The grounding system of the present GFCI circuit is a "star" ground, whereby all points connected to a circuit common ultimately converge at one central grounding point. The single grounding point arrangement is superior to multiple ground arrangements because the circuit occupies a relatively small area compared to one wavelength of the imposing EMI/RFI noise.

The circuit layout includes separate ground planes G1 and G2 (FIG. 3) respectively for power supply and signal circuitry, preventing any energy that is being decoupled to ground from the power supply from influencing the operation of the small signal circuits and vice versa. Primarily, this avoids the particular problem in which the ground pin of the U1 IC chip (which contains a high-gain op-amp) sees a floating potential as a result of RF energy passing through its grounding system from the power supply.

The present circuit also employs ground guarding, whereby all available PCB areas not occupied by signal or power traces are filled in with the ground plane. This provides the lowest impedance path to ground attainable to remove conducted RF energy from the circuit. The large copper areas also act as a shield to couple radiated RF energy directly to ground and away from the circuit elements.

The present circuit arrangement also provides a direct, low-impedance connection to earth ground. The circuit common in the GFCI is connected to the neutral bus in the service equipment, which is connected directly to the earth ground. Thus, all RF energy that is decoupled from the circuit has a direct, continuous, low-impedance path to earth ground. This arrangement is provided by the use of diodes D3 and D4 as a two-element, full wave rectifier to convert the 120/240 volt line power to a 120-volt RMS pulsating DC supply, which looks like a full wave rectification of a single phase 120 volt line. This avoids the use of a full wave bridge rectifier using four diodes according to some prior art GFCI circuits. In full wave four diode bridge circuits, a diode is always in a circuit path between circuit common and the line connections in the load center. Diodes are particularly poor conductors of RF because they tend to modulate and rectify RF signals. The present arrangement using two diodes whereby all RF energy that is decoupled from the circuit has a direct, continuous, low-impedance path to earth ground to minimize RF noise disturbing the GFCI operation.

Although a preferred embodiment of the invention has been shown and described, the present invention is not limited to the preferred embodiment. Numerous variations and modifications to the preferred embodiment will occur to those skilled in the art without departing from the spirit and scope of the invention which is set forth in the appended claims.

What is claimed is:

1. A ground fault interruption circuit, said circuit disconnecting a load from an electrical distribution line in response to ground fault conditions in the load, comprising:

coupling means coupled to an electrical distribution network load providing ground fault imbalance signals;

detector circuit means connected to receive said ground fault imbalance signals and providing a trigger signal when a ground fault condition exists;

control circuit means disconnecting the load from the line in response to said trigger signal;

a filtering circuit connected to said coupling means and said detector circuit for attenuating electromagnetic interference signal components from said ground fault signals;

first and second relative ground planes; and a power supply circuit generating power for said detector circuit;

wherein said supply circuit is grounded to the first relative ground plane, and the coupling circuit and filtering circuit are grounded to the second relative ground plane, to separate noise signals in the respective circuits.

2. The ground fault interruption circuit according claim 1, wherein the filtering circuit comprises a first filter element attenuating differential-mode electromagnetic interference signals.

3. The ground fault interruption circuit according to claim 2, wherein said coupling means comprises a sense transformer having a primary coupled to the electrical distribution line and a secondary winding, and wherein said first filter element comprises a capacitor connected across said secondary winding.

4. The ground fault interruption circuit according to claim 1, wherein the filtering circuit comprises a band stop filter.

5. The ground fault interruption circuit according to claim 1, wherein the filtering circuit comprises a third order filter arranged as a pi-network filter.

6. The ground fault interruption circuit according to claim 1, wherein the control circuit means comprises an SCR and a solenoid connected in series, wherein the SCR provides a low impedance path to ground in response to the trigger signal, and wherein the ground fault interruption circuit comprises a capacitor connected to a control terminal of the SCR to filter noise signals from the SCR control terminal, said capacitor providing a characteristic time constant, to thereby filter noise having a shorter period than said time constant.

7. A ground fault interruption circuit, said circuit disconnecting a load from an electrical distribution line in response to ground fault conditions in the load and comprising:

coupling means coupled to an electrical distribution network load for providing ground fault imbalance signals;

detector circuit means connected to receive said ground fault imbalance signals and providing a trigger signal when a ground fault condition exists;

control circuit means disconnecting the load from the line in response to said trigger signal; and a filtering circuit connected to said coupling means and said detector circuit and attenuating electromagnetic interference signal components from said ground fault signals;

wherein the filtering circuit comprises a first filter element attenuating differential-mode electromagnetic interference signals and a second filter element attenuating common-mode electromagnetic interference signals.

8. The ground fault interruption circuit according to claim 7, wherein the filtering circuit comprises a third filter element attenuating common-mode electromagnetic interference signals.

9. The ground fault interruption circuit according to claim 8, wherein the filtering circuit comprises a fourth filter element attenuating residual differential-mode electromagnetic interference signals.

10. The ground fault interruption circuit according to claim 9, wherein the fourth filter element comprises a resistor and capacitor.

11. The ground fault interruption circuit according to claim 7, wherein the second filter element comprises at least one inductor.

12. The ground fault interruption circuit according to claim 8, wherein the third filter element comprises at least one capacitor.

13. A ground fault interruption circuit, said circuit disconnecting a load from an electrical distribution line in response to ground fault conditions in the load and comprising:

coupling means coupled to an electrical distribution network load and providing ground fault imbalance signals, said coupling means comprising a sense transformer having a primary coupled to the electrical distribution line and a secondary winding having opposite ends;

detector circuit means connected to receive said ground fault imbalance signals and providing a trigger signal when a ground fault condition exists;

control circuit means disconnecting the load from the line in response to said trigger signal;

a filtering circuit connected to said coupling means and said detector circuit and attenuating electromagnetic interference signal components from said ground fault imbalance signals, said filtering circuit comprising a pi-network filter having a first, shunt portion comprising a capacitor connected across the secondary winding, a second, series portion comprising inductors respectively connected in series with opposite ends of the secondary winding, and a third, shunt portion comprising two capacitors respectively connected in shunt with opposite ends of said secondary winding after said second portion, said filtering circuit attenuating differential-mode and common-mode electromagnetic interference signals form said ground fault imbalance signals;

first and second relative ground planes; and a power supply circuit for generating power for said detector circuit;

wherein said supply circuit is grounded to the first relative ground plane, and the coupling circuit and filtering circuit are grounded to the second relative ground plane, to separate noise signals in the respective circuits.

14. The ground fault interruption circuit according to claim 13, wherein the control circuit means comprises an SCR and a solenoid connected in series, wherein the SCR provides a low impedance path to ground in response to the trigger signal, and wherein the ground fault interruption circuit comprises a capacitor connected to a control terminal of the SCR to filter noise signals from the SCR control terminal, said capacitor providing a characteristic time constant, to thereby filter noise having a shorter period than said time constant.

15. A ground fault interruption circuit, said circuit disconnecting a load from an electrical distribution line in response to ground fault conditions in the load and comprising:

coupling means coupled to an electrical distribution network load and providing ground fault imbalance signals;

a detector circuit connected to receive said ground fault imbalance signals and providing a trigger signal when a ground fault condition exists;

control circuit means disconnecting the load from the line in response to said trigger signal;

a filtering circuit connected to said coupling means and said detector circuit and attenuating electromagnetic interference signal components from said ground fault signals; and a pair of relative ground planes respectively conductively coupled to (a) the detector circuit and the filtering circuit and (b) the electrical distribution line.

16. The ground fault interruption circuit of claim 15, wherein at least one of the relative ground planes comprises a metallic layer.

17. A ground fault interruption circuit, said circuit disconnecting a load from an electrical distribution line in response to ground fault conditions in the load and comprising:

coupling means coupled to an electrical distribution network load and providing ground fault imbalance signals;

a circuit board;

a detector circuit, configured on the circuit board, connected to receive said ground fault imbalance signals and providing a trigger signal when a ground fault condition exists;

control circuit means disconnecting the load from the line in response to said trigger signal;

a filtering circuit, configured on the circuit board, connected to said coupling means and said detector circuit and attenuating electromagnetic interference signal components from said ground fault signals; and a pair of relative ground planes configured on the circuit board, which are respectively conductively coupled to (a) the detector circuit and the filtering circuit and (b) the electrical distribution line.

18. The ground fault circuit of claim 17, wherein at least one of the relative ground planes comprises a metallic layer on the circuit board.

19. The ground fault circuit of claim 17, wherein at least one of the relative ground planes is coupled to a service equipment neutral bus.

* * * * *